(12) United States Patent
Spires et al.

(10) Patent No.: US 7,440,533 B2
(45) Date of Patent: Oct. 21, 2008

(54) MODULATED JITTER ATTENUATION FILTER

(75) Inventors: Jeffrey W. Spires, Salt Lake City, UT (US); Ravi Subrahmanyan, Windham, NH (US)

(73) Assignee: Applied Micro Circuits Corporation, San Diego, CA (US)

( * ) Notice: Subject to any disclaimer, the term of this patent is extended or adjusted under 35 U.S.C. 154(b) by 190 days.

(21) Appl. No.: 11/648,920

(22) Filed: Jan. 3, 2007

(65) Prior Publication Data

US 2007/0110059 A1    May 17, 2007

Related U.S. Application Data

(63) Continuation-in-part of application No. 11/541,176, filed on Sep. 29, 2006, and a continuation-in-part of application No. 11/525,656, filed on Sep. 22, 2006, and a continuation-in-part of application No. 10/346,550, filed on Jan. 17, 2003, now Pat. No. 7,212,599.

(51) Int. Cl.
*H04L 25/00*    (2006.01)
*H04J 3/07*    (2006.01)

(52) U.S. Cl. ..................... 375/373; 370/505

(58) Field of Classification Search .......... 375/372, 375/356, 354; 370/505, 506, 516, 503
See application file for complete search history.

(56) References Cited

U.S. PATENT DOCUMENTS

| 7,023,942 | B1 * | 4/2006 | Roberts et al. | 375/356 |
| 7,227,876 | B1 * | 6/2007 | Cochran et al. | 370/509 |
| 7,369,578 | B2 * | 5/2008 | Roberts et al. | 370/506 |

* cited by examiner

*Primary Examiner*—Khai Tran
(74) *Attorney, Agent, or Firm*—Law Office of Gerald Maliszewski; Gerald Maliszewski

(57) ABSTRACT

A system and modulation method are provided for reducing jitter in the mapping of information into Synchronous Payload Envelopes (SPEs), in a data tributary mapping system. The method comprises buffering data from a plurality of tributaries, and generating buffer-fill information responsive to the buffered data being written and read. The buffer-fill information is filtered, producing rate control information. The rate control information is modulated, and the modulated rate control information is used in controlling the mapping of buffered tributaries into a SPE. The rate control information can be modulated with periodic signals, such as a sine or square wave, and pseudorandom signals with an average value of about zero.

18 Claims, 6 Drawing Sheets

MODULATED JITTER ATTENUATION FILTER

RELATED APPLICATIONS

This application is a Continuation-in-part of a application entitled, JITTER AND WANDER REDUCTION APPARATUS, invented by Subrahmanyan et al., Ser. No. 10/346,550, filed Jan. 17, 2003, now U.S. Pat. No. 7,212,599 which is incorporated herein by reference.

This application is a Continuation-in-part of a application entitled, SAMPLED ACCUMULATION SYSTEM AND METHOD FOR JITTER ATTENUATION, invented by Subrahmanyan et al, Ser. No. 11/525,656, filed on Sep. 22, 2006, which is incorporated herein by reference.

This application is a Continuation-in-part of a application entitled, TIMESHARED JITTER ATTENUATOR IN MULTI-CHANNEL MAPPING APPLICATIONS, invented by Spires et al, Ser. No. 11/541,176, filed on Sep. 29, 2006, which is incorporated herein by reference.

BACKGROUND OF THE INVENTION

1. Field of the Invention

This invention generally relates to digital envelope-framed communications and, more particularly, to a system and method for filtering buffer-fill information that is used in the calculation of stuff bit opportunities for loading data tributaries into a Synchronous Payload Envelope (SPE).

2. Description of the Related Art

In a synchronous communications network, digital payload data is carried at a particular clock frequency within a synchronous message format. This payload data may include both asynchronous digital data and synchronous digital data originating at a different data rate in a foreign digital network. The Synchronous Optical Network (SONET), and its European counterpart the Synchronous Digital Hierarchy (SDH), provide a standard format of transporting digital signals having various data rates, such as a DS-0, DS-1, DS-1C, DS-2, or a DS-3 signal and their European counterparts within a Synchronous Payload Envelope (SPE), or a container that is a part of a SONET/SDH STS-N/STM-N message frame. In addition to the digital data that is mapped and framed within the SPE or container, the STS-N/STM-N message frame also includes overhead data that provides for coordination between various network elements, and permits data delineation.

One of the benefits of SONET is that it can carry large (high-speed) payloads (above 50 Mb/s). However, the existing slower speed digital hierarchy can be accommodated as well, thus protecting investments in current equipment. To achieve this capacity, the STS Synchronous Payload Envelope (SPE) can be sub-divided into smaller components or structures, known as Virtual Tributaries (VT) for the purpose of transporting and switching payloads smaller than the STS-1 rate. All services below the DS3 and E-3 rates are transported in the VT structure.

In SONET there are four sizes of virtual tributaries, a VT-6 (12 columns of data), VT-3 (6 columns of data), VT-2 (4 columns of data), and VT-1.5 (3 columns of data). A virtual tributary group (VTG) is formed of a single type of VT and by definition each VTG contains 12 columns of data. Thus, there can be one (1) VT-6, two (2) VT-3, three (3) VT-2, or 4 VT-1.5 VTs per VTG. Because there are 12 data columns per VTG, there are seven VTGs within a single STS-1 SPE, with a column of data providing the path overhead data and two (2) columns of stuff data. The VGs are grouped within a Virtual Superframe that comprises four (4) consecutive STS-1 message frames. The VTGs within the superframe each have varying numbers of VTs within them, and together define a virtual SPE. The VTs contained within the virtual SPE may be operated in a fixed or floating mode. In a fixed mode, the VT SPE mapping into the four (4) STS-1 SPEs comprising the superframe is fixed. This reduces the interface complexity and is designed for maximum efficiency of the network elements. A floating VT mode allows the VT SPE to float within the virtual SPE defined for the VTs. A floating VT requires a VT payload pointer and VT path overhead. In the case of a VT floating within a virtual superframe, the VT payload pointer is defined by bytes, V1 and V2. In addition, payload resynchronization and payload adjustment is accomplished using the V1, V2, and V3 in the same manner as the H1, H2, and H3 bytes in the transport overhead of the STS-1 message as described below.

Similarly, in a SDH STM-1 format, which is based on a 2.048 Mbit/s hierarchy, there is a bandwidth flexible virtual container (VC) that permits the transmission of high-speed packet switched services, ATM, contribution video, and distribution video. In addition, the VC permits transport and networking at the 2 Mbit/s, 34 Mbit/s, and 140 Mbit/s in addition to the 1.5 Mbit/s hierarchy.

The lowest level of multiplexing in a SDH message includes a single container (C). The containers are used to create a uniform virtual container (VC) payload through bit-stuffing to bring all the inputs to the container to a common bit-rate that is suitable for multiplexing in the VCs. There are two levels of VCs. A low level VC, i.e., VC-11, VC-12, and VC-2, includes data at a rate from 1.5 Mbit/s to 6 Mbits/s. Upper level VCs, i.e., VC-3 and VC-4, include data at a rate of 34/45 Mbit/s and 140 Mbit/s. The various VCs are converted into Transmission Units (TUs) with the addition of tributary pointer information. Thus, a VC-11 becomes a TU-11, a VC-12 becomes a TU-12, a VC-2 becomes a TU-2, and a VC-3 becomes a TU-3.

A single TU-2 or 3 TU-12s, or 4 TU-11s are combined into a Transmission Unit Group 2 (TUG-2). Seven TUG-2s can be used to form a VC-3 or a TUG-3. Three TUG-3s are combined to form a VC-4. A single VC-3 or a single VC-4 are converted into an administrative unit three (AU-3) or an AU-4 respectively, with the addition of an administrative unit pointer. Three AU-3s or a single AU-4 are formed into an Administrative Unit Group (AUG). One AU-4, four AU-4s, or 16 AU-4s are formed into an STM-1, STM-4, or an STM-16, respectively. The administrative unit group forms the SPE of the SDH STM-1.

In a floating TU mode, four consecutive 125 microsecond frames of the VC-4 are combined into a single 500 microsecond called a TU multi-frame. The tributary units comprising the TU multi-frame signal also contain payload pointers to allow for flexible and dynamic alignment of the VCs within the TU multi-frame. In this instance, the payload pointer value indicates the offset from the TU to the first byte of the lower order VC. This mechanism allows the AU and TU VC payloads to vary with respect to phase to one another and to the network, while allowing the VCs comprising the AUs and TUs to be synchronously multiplexed. The TU multi-frame overhead consists of four bytes: V1, V2, V3, and V4. Each of the four bytes is located in the first bytes of the respective TU frame in the TU multi-frame signal. The V1 and V2 bytes designate the position of the first byte of the VC, the V3 byte provides a payload pointer adjustment opportunity, and the V4 byte is reserved. Thus each of the VCs within an STM can float relative to one another If the digital data that is mapped and framed in the STS-N/STM-N is originally carried by a clock signal having a different frequency than the SONET/SDH line rate clock, certain adjustments to the framed digital data must be made. For example, if a DS-3 data signal, which is timed by a 44.736 MHz DS-3 clock signal, is to be carried in a SONET/SDH fiber-optic network, the DS3 signal is mapped into the higher rate SPE of an STS-1, and extra bits must be added to the DS-3 signal prior to transmission through the SONET/SDH network. These extra bits are commonly referred to as stuff bits or gap bits, and are place markers and may, or may not carry valid data. These gap bits are required because the DS-3 signal is slower than the SONET/SDH clock frequency, so that there are not enough DS-3 bits at the higher frequency to form a complete SONET frame. More detail may be found in the Bellcore specification "SONET Transport Systems: Common Generic Criteria", GR-253-CORE, Issue 3, Sep. 2000, the Bellcore specification "Transport Systems Generic Requirements (TSGR): Common Requirements", GR-499-CORE, Issue 2, Dec. 1998, and the ITU-T Recommendation G.783, "Characteristics of Synchronous Digital Hierarchy (SDH) Equipment Functional Blocks", January 1994.

When the STS-1 is received at a network exit node, the overhead bytes are removed from the SONET STS-1 and replaced by gaps in the data stream. The payload data that remains is de-framed and de-mapped into a data stream carried at a higher clock frequency than the nominal original clock frequency of the payload data. The stuff data that was inserted when the data was mapped into the SPE remains when the data stream is recovered from the SPE, and is also replaced by gaps in the data stream. Thus, the recovered payload data contains gaps in the data stream remaining after the overhead bytes and stuff data bits have been removed. If, for example, DS-3 data has been transported via a SONET/SDH network, the DS-3 data must be converted from the SONET clock signal to the lower frequency DS-3 clock signal and the gap data bits must be removed prior to the DS-3 signal being B3ZS-encoded for electrical re-transmission.

To transfer data from one clock domain to another, for example from the DS-3 embedded within the SONET signal rate to the proper DS-3 signal rate, a desynchronizer is used to provide a buffering mechanism between the clock domains. A desynchronizer typically includes an elastic store first-in-first-out memory buffer that receives gapped data recovered from a synchronized data payload as an input at one clock frequency and stores the data in appropriate storage locations. The desynchronizer also includes an output mechanism that reads data out of the buffer at a uniform data rate, without the gaps.

Although the SONET/SDH fiber optic network is a synchronous network, variations in clock signals across the network may occur. These variations in clock signals between various network elements may cause a loss of data downstream from the sender if the clock signal at which data is written to the synchronous payload and the clock signal at which the data is read from the synchronous payload are sufficiently different. A variety of conditions can cause variations in clock signals. For example, network clock instability, electrical noise and interference, effective changes in the length of transmission media, changes in the velocity of propagation, Doppler shifts, irregular timing information, and other electrical and network problems may all cause clock variations.

To mitigate the problems caused by clock variations across a network, the SONET/SDH STS-N/STM-N messages are provided with a pointer adjustment mechanism within the transmission overhead bytes that permit some movement of the data within the SPE. The pointer adjustment mechanism includes a pair of bytes, H1 and H2, which identify the start of the next SONET/SDH payload byte and also indicate if the pointer adjustment byte, H3, is to be used. The third overhead byte (H3) provides for active pointer adjustment when a negative justification of the SPE is required. Negative justification involves posting valid data in the H3 byte. Positive justification involves marking the byte after the H3 byte as a dummy or stuff byte. These pointer adjustments allow for eight (8) bits of data to be added to a SONET/SDH message frame (using the H3 overhead byte) or for eight (8) bits to be removed from the frame. This allows for the SPE to be re-framed and re-synched at a network node that has a slightly different network clock. Thus, in addition to the gap data necessary to compensate for payload data that is carried by a different frequency clock signal, eight bits of data may be added or removed at each network element in the network due to clock instability in the network.

Pointer adjustments can be periodic or aperiodic in nature. A periodic pointer adjustment may be caused, for example, when, the SPE transporting the data has a constant clock offset at the output node of the network relative to the input node. An aperiodic or non-periodic pointer adjustment may be bursty in nature when caused by a transient problem or condition within the network.

Although the synchronous system may adjust the payload data using pointer adjustments to account for clock and phase variations, the clock and phase shifts caused by the pointer adjustments and/or the de-gapping of the payload data can affect the output rate of the data clock provided by the PLL. Typically, clock and phase shifts have two components. One is a high frequency jitter component that is classified as a clock or phase shift that is greater than, or equal to 10 Hz. A second is a low frequency wander component that is classified as a clock or phase shift that is less than 10 Hz.

Jitter refers to the phase variations in the clock signal, which may cause errors in identifying bit positions and values accurately, and is therefore an issue in synchronous systems. The jitter requirement for SONET can be found in the ANSI document "Synchronous Optical Network (SONET)—Jitter at Network Interfaces", ANSI-T1.105.03-1994. Wander refers to phase variations that typically affect the frame and time-slot synchronization. The wander requirement for SONET can be found in the ANSI document "Synchronous Optical Network (SONET)—Jitter at Network Interfaces—DS3 Wander Supplement", ANSI-T1.105.03b-1997. Each network element adds some amount of noise to the SPE that eventually contributes to the timing instability in the form of jitter and wander in the recovered payload signal.

As is known, the PLL used to recover the smooth clock signal and smooth data signal is able to smooth out some phase jumps caused by pointer adjustments or asynchronous stuff bits. A PLL is most effective at filtering out high frequency jitter components, i.e., those with a frequency greater than 10 Hz, but is less effective at filtering out the low frequency wander components. Since, typically the wander components are much less than 10 Hz, these wander components are well within the bandwidth of the PLL and are passed without being attenuated. To construct a PLL with a small enough bandwidth to filter the wander components of the phase jumps, large time constants in the PLL control loops would require large component values for the resistors and capacitors used in the PLL. In addition, the large time constants required would result in a PLL that is slow to lock onto the reference signal and would cause long delays in recovering lock after a transient event.

One source of wander errors in the output data rate can be caused by the pointer adjustments within the synchronous signals. Each pointer adjustment signal or asynchronous gap data results in a data gap for a given number of clock cycles. For example, an 8-bit pointer adjustment that occurs once a second or less, is a low frequency change in the data rate.

When a pointer adjustment is received however, there are eight bits that are added to the elastic store, or skipped, and not written to the elastic store. The inconsistent nature of the gapped data can result in large changes in the data output rate. The ratio between the input data rate and the output data rate may change by a value sufficiently large that the elastic store can experience a data overflow condition or a data underflow condition. Data overflow occurs when data is written to the elastic store at a faster rate than usual, or read at a slower rate than usual, causing the elastic store to accumulate data. In these conditions, the elastic store may be unable to store all of the incoming data, and data may be lost. Similarly, data underflow occurs when data is written to the elastic store at a slower rate than usual, or read at a faster rate than usual, causing the elastic store to lose data. In this circumstance no data is read from the elastic store.

Typically, the elastic store used in the desynchronizer is a FIFO buffer with a write/read control system that attempts to maintain the output data rate at a specified rate, and maintain the elastic store at a predetermined fill level. If the elastic store begins to overfill, the write/read control system increases the data output rate of the elastic store until the proper storage level in the elastic store is reached. Once the proper storage level is reached, the write/read control system decreases the data output rate. If the elastic store begins to underfill, the write/read control system will decrease the data output rate of the elastic store until the proper storage level in the elastic store is reached. Once the proper level is reached, the write/read control system increases the data output rate.

As noted above, the VT or TU-11/12 pointer bytes V1, V2, and V3 operate in the same manner as the H1, H2, and H3 pointer bytes described herein. Similar problems related to the processing of the VT pointer bytes occur, and the positive justification of the VT pointer bytes is accomplished by assigning the bytes immediately after the V3 bytes as positive stuff opportunity bytes. Negative justification is accomplished by assigning the V3 byte to contain valid data. The frequency and polarity of the pointer adjustments to the VT pointer bytes is uncorrelated to the frequency of the pointer adjustments made by the SONET/SDH H1-H2-H3 pointer bytes. In addition, the wander and jitter associated with the pointer adjustments is also uncorrelated between the transport overhead pointer bytes and the VT overhead pointer bytes.

The highly non-uniform input data rate to a SONET SPE is primarily due to the presence of transport overhead (TOH) and the position of data bits and stuff bits in the SONET SPE. The TOH data is not provided as output data since the de-mapper in the SONET receiver only provides a write enable signal when valid data from the SPE is present. Thus, there may be long gaps with no data when TOH data is present. As discussed above, stuff bits may be added to the SPE when mapping PDH data into the SONET SPE, to account for different data rates between the PDH data and the SONET data rate. Typically, stuff bits when mapped into the SPE are not valid data and are mapped into known locations. The de-mapper skips over the stuff bits, and a short gap of no data occurs.

A filter and the read enable generator may be used to substantially smooth the non-uniform data input rate. The filter and read enable generator can vary the nominal rate at which read enable signals are generated by controlling stuff opportunities during the data output in which data bits can be added to the nominal data rate, thereby increasing the data rate, or removed from the nominal rate, thereby decreasing the data rate.

The filter and rate enable generator provide an output control word that is indicative of the storage level of tributaries, in preparation for mapping into an SPE. The control word can be the average of the storage level over a predetermined time period, or a value derived from the average or other suitable statistics based on the storage level. For example, the filter may be a low pass filter that averages out fluctuations in the storage level by filtering the high-frequency components to provide the average value, which may be scaled by multiplying it by a predetermined constant, as the control word.

A mapper may be used to map data channels into frames defined by network protocol, where adjacent frames are separated by a frame boundary. For example, PDH tributaries may be mapped into SPEs using SONET protocol.

FIG. 1 shows a closed loop system used for phase attenuation or data-rate recovery (prior art). Incoming data is written into a buffer. The buffer-fill is filtered to generate a control signal that drives a rate generator. The rate generator produces a read signal, which is used to read data out from the buffer. The operation of this system is such that the output rate is made to match the incoming rate, which effectively recovers the data rate. The closed-loop transfer function of the system can also be arranged such that the output data rate, though on average the same as the input data rate, is much smoother than the incoming data rate, which is typically noisy due to data transmission effects such as mapping and demapping.

FIG. 2 shows a variation of the system shown in FIG. 1, in which the buffer fill signal is modulated (prior art). This "threshold modulation" concept is typically used for making bit-stuff decisions in systems without filters, by comparing the buffer-fill against a varying threshold, which is equivalent to modulating the buffer-fill and comparing that result against a threshold. Then, a stuffing (or not stuffing) decision is made depending on the result of the comparison. This method is not preferred because it can produce high levels of output wander. The system is not especially effective when filters are used, and does not remove the effect of limit cycles (discussed below). Also, each channel (buffer) requires an independent filtered buffer-fill signal, which results in a large amount of hardware if the system is multi-channel.

FIG. 3 shows a variation of the system shown in FIG. 1, in which the output read-enable signals are modulated (prior art). For example, a "dither" signal can be applied to the read-enable as a variation of the threshold modulation scheme. As in the system of FIG. 2, a multi-channel system requires a separate modulation circuit for each buffer, which results in duplicated hardware circuits. Further, it is not apparent that such a design may be used in systems that directly calculate the stuff control signals that are sent to the mapper (instead of the entire read enable signal being sent to the buffer).

The systems shown in FIGS. 2 and 3 may be analog or digital. In a fully analog system, the filter can be an analog filter, and the rate generator can be a voltage-controlled-oscillator (VCO). As described in parent application Ser. No. 10/346,550, in a digital system the filter can be a digital filter, and the rate generator can be a digitally-controlled oscillator. A combination of analog and digital components may also be used (analog filter+analog-to-digital converter+digital rate generator, or digital filter+digital-to-analog converter+VCO).

The use of a digital loop filter in a desynchronizer or jitter-attenuator can result in high jitter spikes due to limit cycle behavior. This limit cycling phenomenon is a well known problem associated with closed-loop systems that use digital control signals. The normal solution to the limit cycling problem is to change the form of the filter, but this solution requires more hardware, which is a disadvantage in high-density applications.

It would be advantageous if a hardware-efficient method existed for controlling the impact of limit cycles, and reducing output jitter in jitter attenuation systems.

SUMMARY OF THE INVENTION

As noted above, the use of a digital loop filter in a desynchronizer or jitter-attenuator can result in high jitter spikes due to limit cycle behavior. The normal solution is to change the form of the filter, but this solution requires more hardware, which is a disadvantage in high-density applications. The present invention is a hardware-efficient method for controlling the impact of limit cycles and reducing output jitter.

Accordingly, a modulation method is provided for reducing jitter in the mapping of information into Synchronous Payload Envelopes (SPEs), in a data tributary mapping system. The method comprises buffering data from a plurality of tributaries, and generating buffer-fill information responsive to the buffered data being written and read. The buffer-fill information is filtered, producing rate control information. The rate control information is modulated, and the modulated rate control information is used in controlling the mapping of buffered tributaries into a SPE. The rate control information can be modulated with periodic signals, such as a sine or square wave, or pseudorandom signals with an average value of about zero.

In one aspect, the method generates a regulated buffer read enable signal in response to the modulated rate control information. Tributary data is supplied to the mapper, from the buffer, at a rate responsive to the regulated buffer read enable signal. Then, controlling the mapping of buffered tributaries into the SPE includes mapping the buffered tributaries responsive to the rate at which the buffered tributary data is received.

In another aspect, subsequent to reading the buffered tributary data, outgoing tributaries are mapped into the SPE, and controlling the mapping of buffered tributaries into the SPE includes regulating the use of stuff bits in the mapping of the tributaries. Specifically, a stuff bit mapping pattern is generated in response to the modulated rate control information. Then, generating a stuff bit mapping pattern, and regulating the use of stuff bits in the mapping of the tributaries, means that the stuff bit mapping pattern is regulated.

Additional details of the above-described method and a modulation system for reducing jitter in the mapping information into an SPE are provided below.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

Although the apparatus described herein has application to any synchronous communication system, exemplary aspects of the invention are presented below in the context of a synchronous optical network (SONET) transmitter and mapper.

Figure 4:
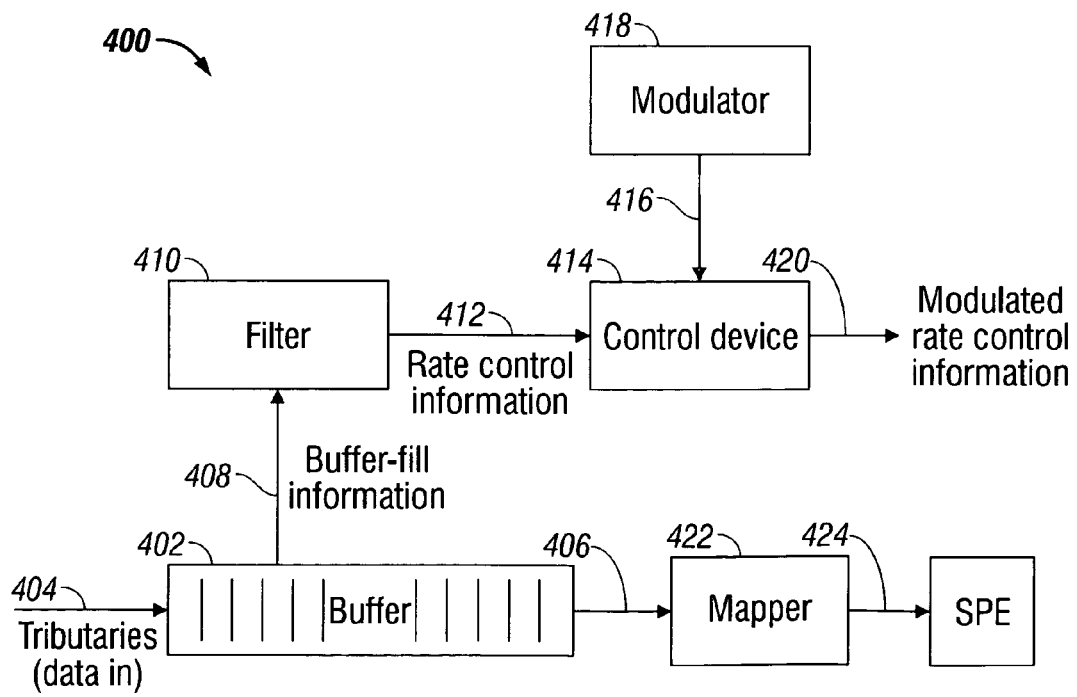
FIG. 4 is a schematic block diagram of a modulation system for reducing jitter in the mapping of data tributaries into Synchronous Payload Envelopes (SPEs).

FIG. 4 is a schematic block diagram of a modulation system for reducing jitter in the mapping of data tributaries into Synchronous Payload Envelopes (SPEs). The system 400 comprises a buffer 402 having an input on line 404 to accept data from a plurality of tributaries, and an output on line 406 to supply tributary data. The buffer 402 has an interface on line 408 to supply buffer-fill information responsive to the buffered data being written and read. A filter 410 has an input on line 408 to accept the buffer-fill information and an output on line 412 to supply rate control information.

A control device 414 has an input on line 412 to accept the rate control information, and an input on line 416 to accept a modulation signal from modulator 418. In one aspect, the modulator 418 supplies a modulation signal that is periodic, such as a sine, square, or triangular waveform, to name a few examples. Alternately, the modulation signal may be pseudorandom, having an average value of about zero.

The control device 414 has an output on line 420 to supply modulated rate control information. A mapper 422 has an input connected to receive buffered tributary data on line 406, and an output on line 424 to supply tributaries mapped into a SPE. The mapping is controlled in response to the modulated rate control information on line 420.

Figure 5:
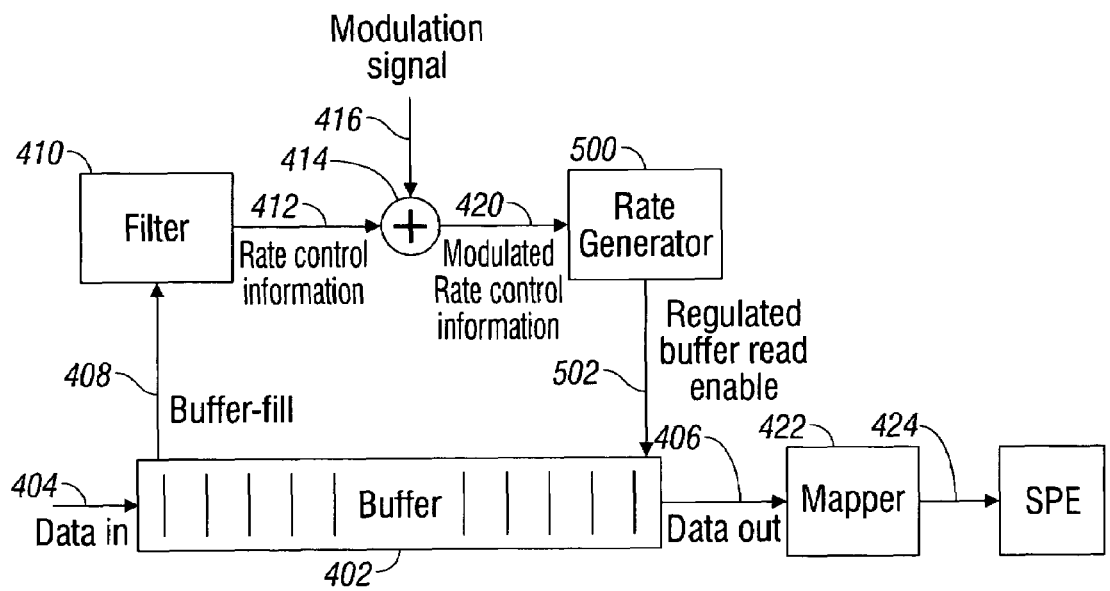
FIG. 5 is a schematic block diagram depicting a first variation of the system shown in FIG. 4.

FIG. 5 is a schematic block diagram depicting a first variation of the system shown in FIG. 4. As shown, the control device 414 is a summing device. A rate generator 500 has an input on line 420 to accept the modulated rate control information and an output on line 502 to supply a regulated buffer read enable signal. The buffer 402 has an input on line 502 to accept the regulated buffer read enable signal. The buffer 402 supplies buffered tributary data to the mapper on line 406, at a rate responsive to the regulated buffer read enable signal on line 502. The mapper 422 controls the mapping of tributaries into the SPE in response to the rate at which the buffer tributary data is received on line 406.

Figure 6:
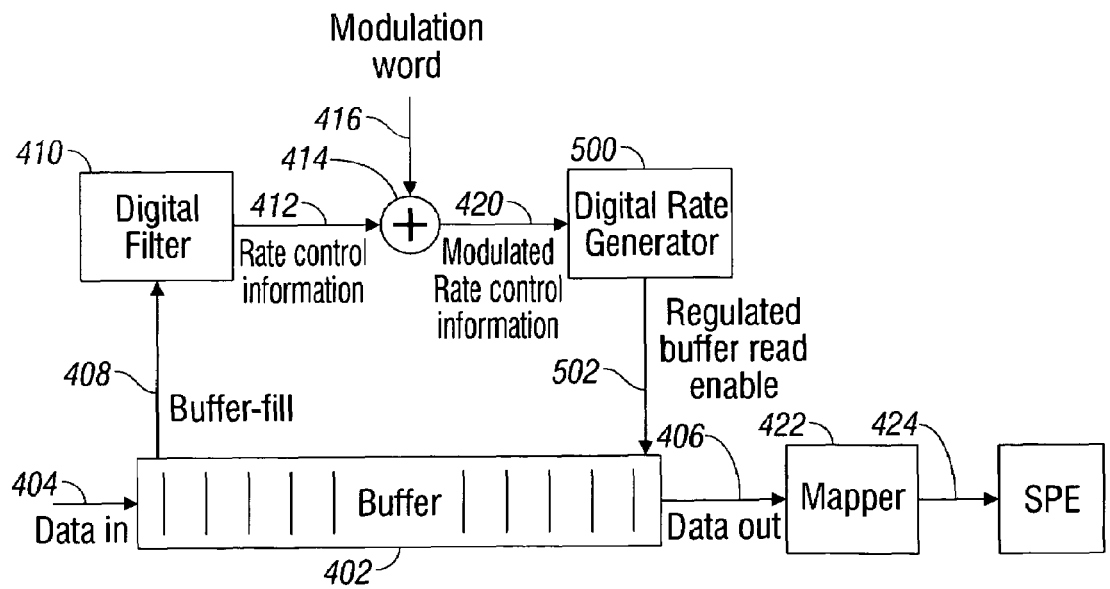
FIG. 6 is a schematic block diagram depicting a second variation of the system shown in FIG. 4.

FIG. 6 is a schematic block diagram depicting a second variation of the system shown in FIG. 4. The present invention system may be enabled with either a digital filter 410, as shown in FIG. 6, or an analog filter (see FIG. 5). Likewise, the control device 414 may produce digital rate control information (FIG. 6), or analog rate control information (FIG. 5). That is, the rate generator 500 may be digital (FIG. 6) or analog (FIG. 5). When the filter 410 is a digital filter, the system is able to reduce the impact of limit cycle oscillations in the mapping of buffered tributaries into the SPE, in response to modulating the rate control information. While the impact reduction of the limit cycle oscillations may be understood as a closed loop system response to modulating the rate control information, for simplicity these beneficial results may also be thought of as being associated with the actions of the mapper.

Although not specifically shown, a combination of analog and digital components can be used. For example (but not shown), an analog filter may feed its output to an analog-to-digital converter, which supplies digital rate control information to a digital rate generator, such as a numerically controlled oscillator (NCO). Alternately, but not shown, a digital filter may feed its output to a digital-to-analog converter, which supplies analog rate control information to an analog rate generator, such as a voltage controlled oscillator (VCO).

Figure 1:
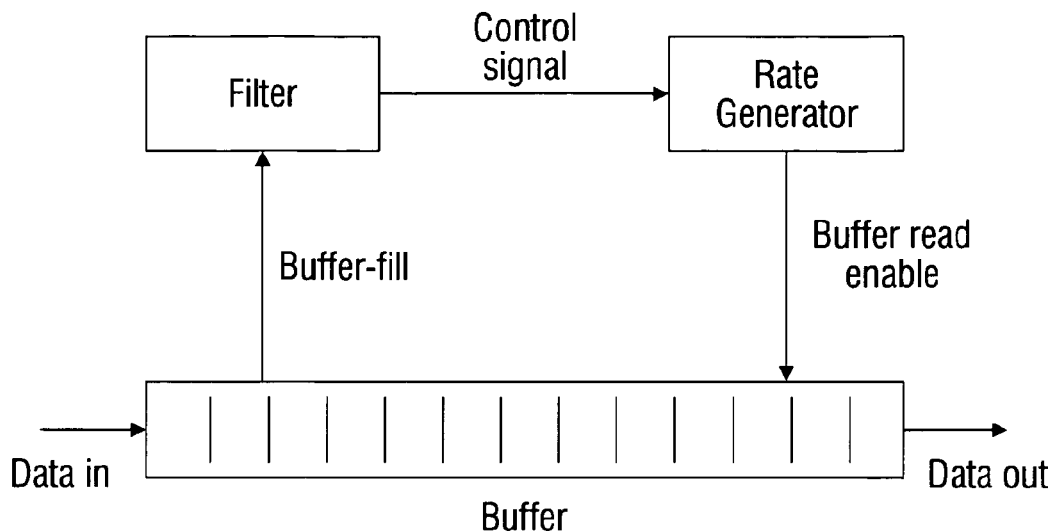
FIG. 1 shows a closed loop system used for phase attenuation or data-rate recovery (prior art).

In a conventional single-channel system, as shown in FIG. 1, it is unnecessary to modulate the rate control signal if an analog filter-based design is being used. This is because the buffer-fill or read-enable signals, being digital words, are easily modulated. However, in a multi-channel system that is not timesliced, even the modulation of a digital buffer-fill, rate control, or read-enable signal is hardware intensive, because parallel hardware circuitry must be implemented, one copy per tributary. One advantage of a timeslicing system is that only a single timeshared rate control signal need be generated, and the single rate control signal can be modulated with a single hardware circuit.

Figure 7:
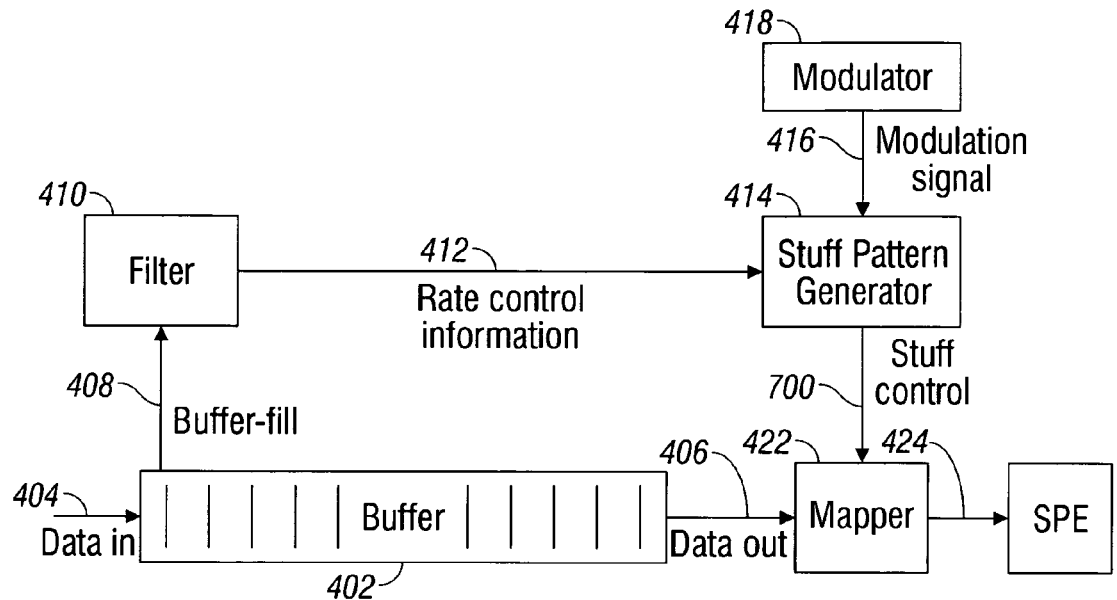
FIG. 7 is a schematic block diagram depicting a third variation of the system shown in FIG. 4.

FIG. 7 is a schematic block diagram depicting a third variation of the system shown in FIG. 4. As shown, the control circuit 414 is a stuff pattern generator supplying the modulated rate control information in the form of a regulated stuff control signal on line 700. The mapper 422 has an input on line 700 to accept the regulated stuff control signal. The mapper 422 controls the mapping of buffered tributaries into the SPE in response to the regulated stuff control signal on line 700. When the filter 410 is a digital filter, the mapper 422 is able to reduce the impact of the limit cycle oscillations in the mapping of buffered tributaries into the SPE, in response to modulating the rate control information. Alternately, the impact reduction of the limit cycle oscillations may be understood as a closed loop system response to modulating the rate control information. For simplicity, these beneficial results may also be thought of as being associated with the actions of the mapper.

Figure 8:
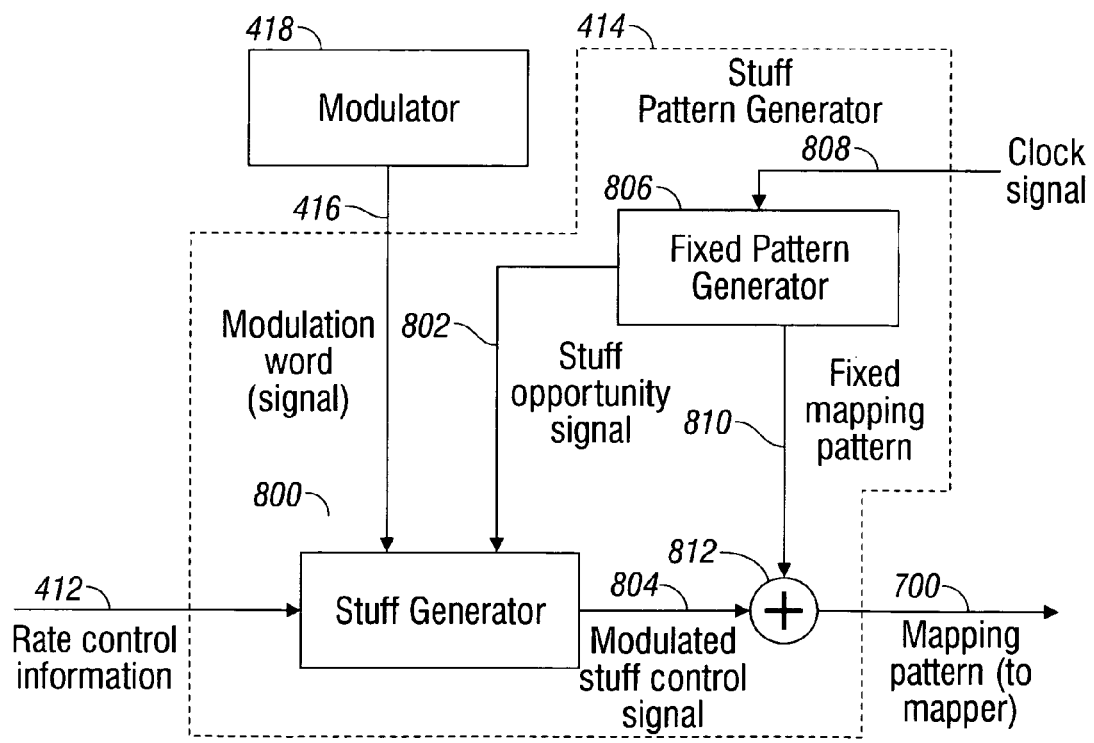
FIG. 8 is a schematic block diagram depicting details of the stuff pattern generator shown in FIG. 7.

FIG. 8 is a schematic block diagram depicting details of the stuff pattern generator shown in FIG. 7. The stuff pattern generator 414 supplies a regulated stuff control signal on line 700 that includes a non-fixed stuff bit mapping pattern. The mapper (see FIG. 7) controls the mapping of the tributaries in the SPE is response to the non-fixed stuff bit mapping pattern.

The stuff pattern generator 414 includes a stuff generator 800 having an input to accept rate control information from the filter on line 412, the modulated signal on line 416, and a stuff opportunity signal on line 802. The stuff generator 800 has an output on line 804 to supply a modulated stuff control signal. A fixed pattern generator 806 has an input on line 808 to accept a system clock signal, an output on line 802 to supply the stuff opportunity signal, and an output on line 810 to supply a fixed mapping pattern signal. A summing device 812 has an input on line 804 to accept the modulated stuff control signal, an input on line 810 to accept the fixed mapping pattern signal, and an output on line 700 to supply the non-fixed stuff bit mapping pattern.

Figure 2:
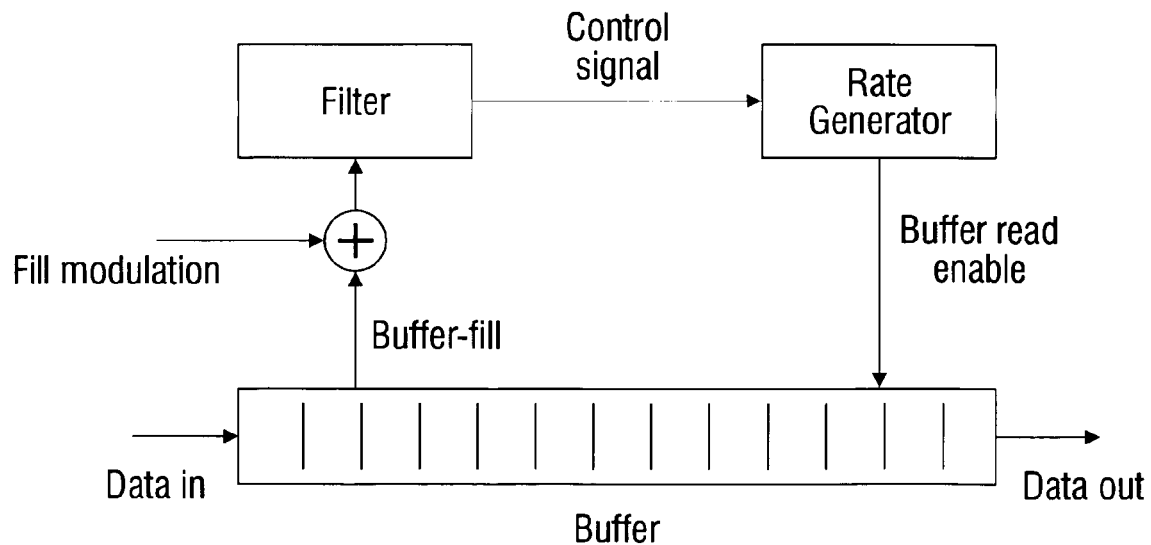
FIG. 2 shows a variation of the system shown in FIG. 1, in which the buffer fill signal is modulated (prior art).
Figure 3:
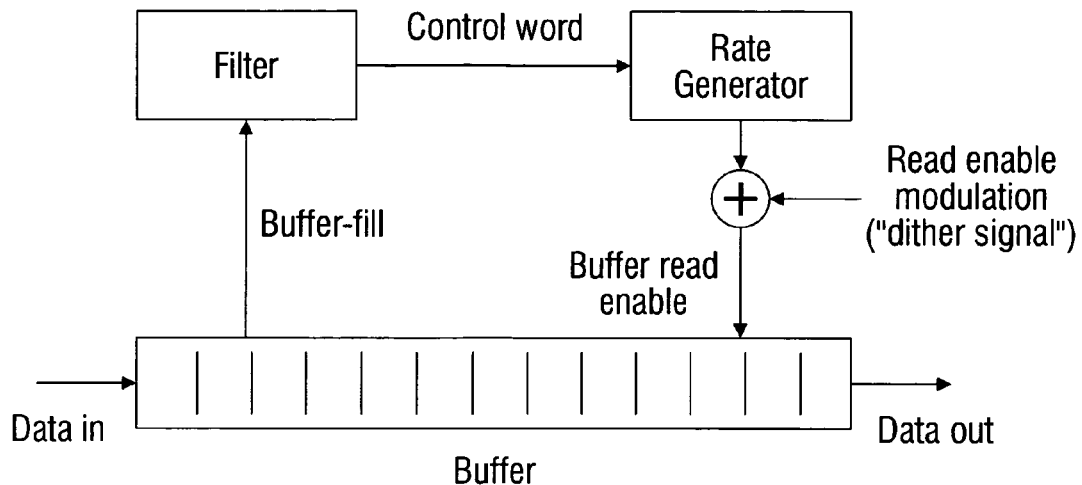
FIG. 3 shows a variation of the system shown in FIG. 1, in which the output read-enable signals are modulated (prior art).

One advantage shared in common by all the systems shown in FIGS. 4-8, is that the modulated rate control information, whether it is in the form of a buffer read enable signal or a stuff bit control signal, may be used in multi-channel applications. That is, a single modulated rate control information signal may be used to manage all the tributaries (channels) being mapped into SPEs. The systems shown in FIGS. 2 and 3 require a separate modulated signal for each tributary.

Functional Description

Returning to FIG. 7, the depicted system is able to directly control the stuff signals going to the mapper, instead of creating the full output rate. In other words, the stuff pattern generator shown in FIG. 7 replaces the rate generator shown in FIGS. 5 and 6. In such an implementation the "fixed" part of the rate is created independently, for example by the mapper. Alternately, as shown if FIG. 8, a fixed pattern generator can be implemented in the generation of the stuff signal. Either way, the "rate generator" then only controls the variations by means of the stuff signals. Such a stuff generator facilitates the implementation of efficient high-density mapping systems.

Figure 9:
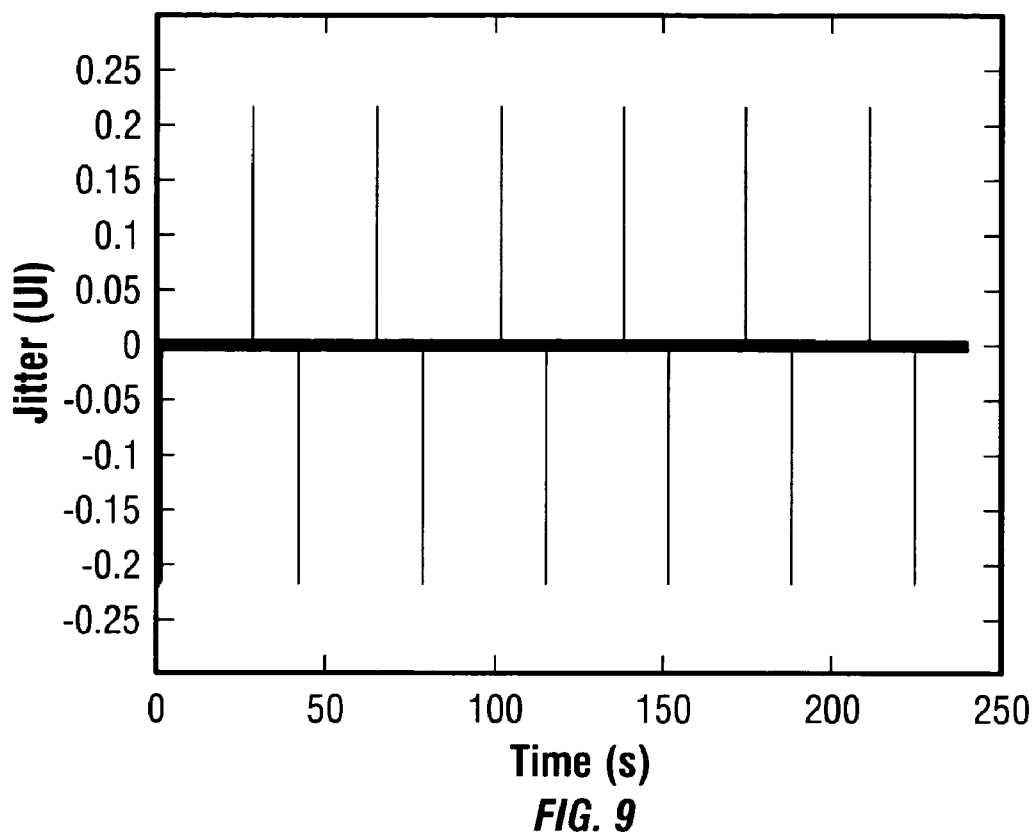
FIG. 9 is a graph depicting the relationship between limit cycle oscillations and output jitter.

FIG. 9 is a graph depicting the relationship between limit cycle oscillations and output jitter. Digital filters are susceptible to limit cycle oscillations, in circumstances when the input error becomes small enough to approach zero. A limit cycle oscillation causes relatively large output swings between some (usually two) values. In a mapper application, this creates jitter spikes in the output data rate, and can cause compliance failures. The limit cycle oscillation problem can be addressed by changing the form of the filter, or by adding a DC canceller to the filter. However, both of these solutions require additional hardware. In many circumstances it is desirable to keep the filter as simple as possible to facilitate efficient hardware implementation.

Figure 10:
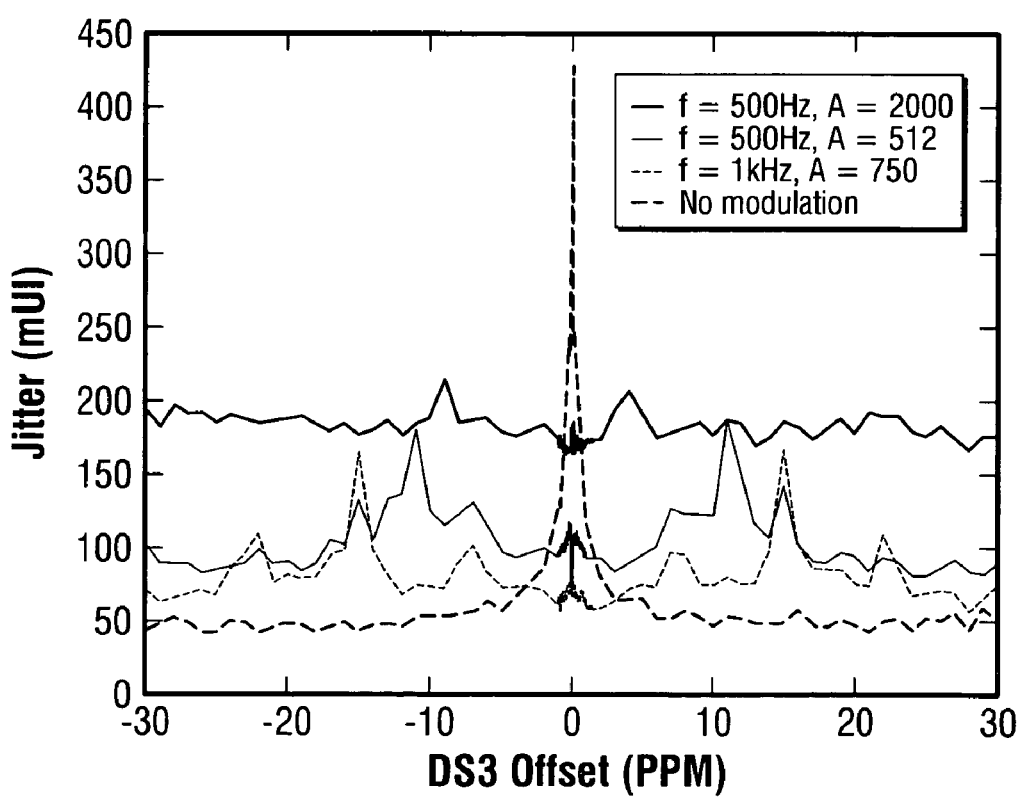
FIG. 10 is a graph comparing the jitter in an unmodulated signal, to modulated rate control signals.

FIG. 10 is a graph comparing the jitter in an unmodulated signal, to modulated rate control signals. For example, a control word may vary in the following cyclic pattern: −2, 0, 1, −1, 0, 2, −1. The modulation signal can be square wave with an amplitude (A) of 3 as follows: +3, −3, +3, −3, +3, −3, +3. The resultant modulated control word would be +1, −3, +4, −4, +3, −1, +2. In this example the control word and the modulation signal have the same frequency, for simplicity however, the two frequencies may also be different, as shown in the curves.

The modulation schemes shown in FIGS. 4-7 permit a simple filter to be used, which still has a low level of limit cycle oscillations. However, as shown in FIG. 10, the jitter is significantly reduced. The jitter is measured as a function of data rate deviation from ideal. The unmodulated curve shows a large spike near 0 parts per million (ppm). The other curves show the measured jitter for various modulation parameters, and it is seen that the large central spike is removed by the modulation.

A very efficient implementation is achieved by adding the modulation signal directly into the stuff generator as shown in FIG. 8. The stuff generator itself is described in parent application Ser. No. 10/346,550. Within the stuff generator is a constant parameter that is used to calculate the output stuff control bits. The modulation signal can be added by varying that parameter. In a simple case, the modulation signal is a square wave with an average value of 0. The modulation can be achieved by adding the modulation level to the parameter on one calculation, and subtracting it from the parameter on the next calculation. More complex schemes can be implemented by varying over time the value added to or subtracted from the parameter.

Directly modulating the control word results in a modification of the output stuff control bit stream, which in turn varies the output rate from the buffer. The extent of the applied modulation (amplitude/frequency) determines the amount of phase shift in the data stream, which shapes the frequency content of the resulting data signal. The modulation can be done at a frequency significantly higher than the cutoff frequency of the desynchronizer used to recover the mapped data. This frequency limits the impact of the modulation to the local loop, where it helps to remove the effect of limit cycles, and hides the impact of the modulation from the recovered data on the far end.

Therefore, it is advantageous to directly modulate the control output from the filter. Modulating the control word prior to the stuff generator in a digital mapper provides a single point of application where the modulation signal only needs to be applied to one signal. This is particularly useful in high-density applications that timeshare the filter and the stuff generator. This results in a hardware efficient implementation that removes the impact of the limit cycles and allows for the use of a simpler filter.

Figure 11:
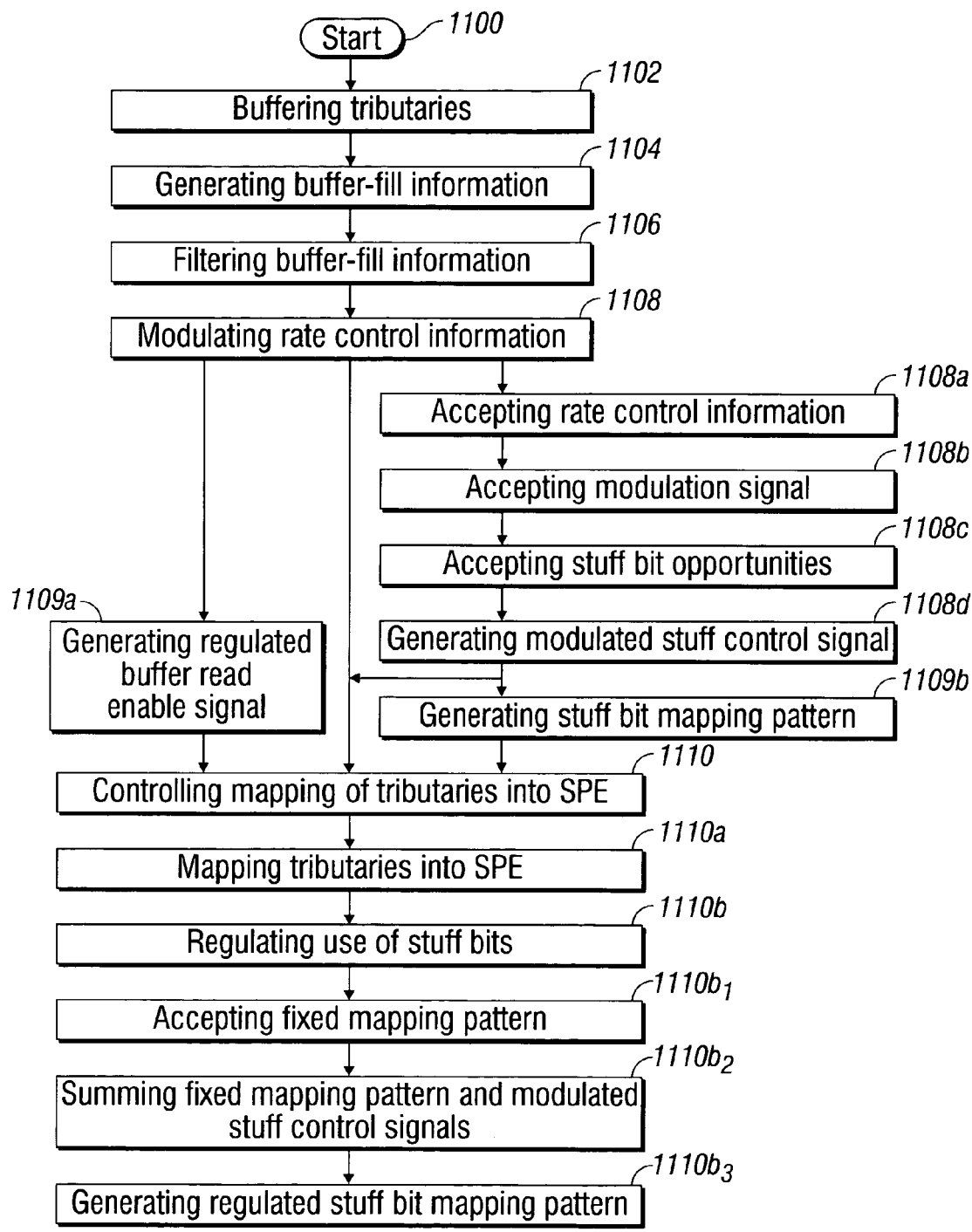
FIG. 11 is a flowchart illustrating a modulation method for reducing jitter in the mapping of information into SPEs, in a data tributary mapping system.

FIG. 11 is a flowchart illustrating a modulation method for reducing jitter in the mapping of information into SPEs, in a data tributary mapping system. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1100.

Step 1102 buffers data from a plurality of tributaries. Step 1104 generates buffer-fill information responsive to the buffered data being written and read. Step 1106 filters the buffer-fill information, producing rate control information. Step 1106 may employ a digital or an analog filtering process. Likewise, the rate control signal produced may be either digital rate control information or analog rate control information. Step 1108 modulates the rate control information. For example, a periodic signal can be used for modulation, or pseudorandom signals with an average value of about zero. Step 1110 controls the mapping of buffered tributaries into a SPE in response to the modulated rate control information.

In one aspect, Step 1109a generates a regulated buffer read enable signal in response to the modulated rate control information. In this aspect buffering data from the plurality of tributaries in Step 1102 includes supplying tributary data to the mapper at a rate responsive to the regulated buffer read enable signal. Then, controlling the mapping of buffered tributaries into the SPE in Step 1110 includes mapping the buffered tributaries responsive to the rate at which the buffered tributary data is received.

In a different aspect, controlling the mapping of buffered tributaries into the SPE (Step 1110) includes substeps. Step 1110a maps outgoing tributaries into the SPE, subsequent to reading the buffered tributary data. Step 1110b regulates the use of stuff bits in the mapping of the tributaries. Further, if Step 1109b generates a stuff bit mapping pattern in response to the modulated rate control information, then regulating the use of stuff bits in the mapping of the tributaries (Step 1110b) includes regulating the stuff bit mapping pattern.

In this aspect, modulating the rate control information in Step 1108 may include substeps. Step 1108a accepts the rate control information. Step 1108b accepts modulation signals. Step 1108c accepts stuff bit opportunity signals. Step 1108d generates a modulated stuff control signal. Then, regulating the stuff bit mapping pattern in Step 1110b may include substeps. Step 1110b1 accepts a fixed mapping pattern. Step 1110b2 sums the fixed mapping pattern and the modulated stuff control signal. Step 1110b3 generates a regulated stuff bit mapping pattern.

In a different aspect, if Step 1106 filters the buffer-fill information using a digital filter, then controlling the mapping of buffered tributaries into the SPE (Step 1110) includes reducing limit cycle oscillations in response to modulating the rate control information.

A system and method have been provided for a modulation method that reduces jitter in the mapping of information into SPEs. Some exemplary block diagram circuitry and process details have been presented to illustrate the invention. However, the invention is not limited to merely these examples. Other variations and embodiments of the invention will occur to those skilled in the art.

We claim:

1. In a data tributary mapping system, a modulation method for reducing jitter in the mapping of information into Synchronous Payload Envelopes (SPEs), the method comprising:
  buffering data from a plurality of tributaries;
  generating buffer-fill information responsive to the buffered data being written and read;
  filtering the buffer-fill information, producing rate control information;
  modulating the rate control information;
  in response to the modulated rate control information, controlling the mapping of buffered tributaries into a SPE.

2. The method of claim 1 wherein modulating the rate control information includes modulating the rate control information with a signal selected from a group consisting of periodic signals and pseudorandom signals with an average value of about zero.

3. The method of claim 1 further comprising:
generating a regulated buffer read enable signal in response to the modulated rate control information;
wherein buffering data from the plurality of tributaries includes supplying tributary data to the mapper at a rate responsive to the regulated buffer read enable signal; and,
wherein controlling the mapping of buffered tributaries into the SPE includes mapping the buffered tributaries responsive to the rate at which the buffered tributary data is received.

4. The method of claim 1 wherein controlling the mapping of buffered tributaries into the SPE includes:
mapping outgoing tributaries into the SPE, subsequent to reading the buffered tributary data; and,
regulating the use of stuff bits in the mapping of the tributaries.

5. The method of claim 4 further comprising:
in response to the modulated rate control information, generating a stuff bit mapping pattern; and,
wherein regulating the use of stuff bits in the mapping of the tributaries includes regulating the stuff bit mapping pattern.

6. The method of claim 5 wherein modulating the rate control information includes:
accepting the rate control information;
accepting modulation signals;
accepting stuff bit opportunity signals; and,
generating a modulated stuff control signal; and,
wherein regulating the stuff bit mapping pattern includes:
accepting a fixed mapping pattern;
summing the fixed mapping pattern and the modulated stuff control signal; and
generating a regulated stuff bit mapping pattern.

7. The method of claim 1 wherein filtering the buffer-fill information includes digitally filtering the buffer-fill information; and,
wherein controlling the mapping of buffered tributaries into the SPE includes reducing limit cycle oscillations in response to modulating the rate control information.

8. The method of claim 1 wherein filtering the buffer-fill information to produce rate control information includes an operation selected from a group consisting of digital filtering and analog filtering.

9. The method of claim 1 wherein producing rate control information includes producing a signal selected from a group consisting of digital rate control information and analog rate control information.

10. A modulation system for reducing jitter in the mapping of data tributaries into Synchronous Payload Envelopes (SPEs), the system comprising:
a buffer having an input to accept data from a plurality of tributaries, an output to supply tributary data, and an interface to supply buffer-fill information responsive to the buffered data being written and read;
a filter having an input to accept the buffer-fill information and an output to supply rate control information;
a control device having an input to accept the rate control information, an input to accept a modulation signal, and an output to supply modulated rate control information; and,
a mapper having an input connected to receive buffered tributary data, and an output to supply tributaries mapped into a SPE, where the mapping is controlled in response to the modulated rate control information.

11. The system of claim 10 further comprising:
a modulator having an output to supply a modulation signal selected from a group consisting of periodic and pseudorandom signals having an average value of about zero.

12. The system of claim 10 wherein the control device is a summing device;
the system further comprising:
a rate generator having an input to accept the modulated rate control information and an output to supply a regulated buffer read enable signal;
wherein the buffer has an input to accept the regulated buffer read enable signal, the buffer supplying buffered tributary data to the mapper at a rate responsive to the regulated buffer read enable signal; and,
wherein the mapper controls the mapping of tributaries into the SPE in response to the rate at which the buffer tributary data is received.

13. The system of claim 10 wherein the control circuit is a stuff pattern generator supplying the modulated rate control information in the form of a regulated stuff control signal; and,
wherein the mapper has an input to accept the regulated stuff control signal, the mapper controlling the mapping of buffered tributaries into the SPE in response to the regulated stuff control signal.

14. The system of claim 13 wherein the stuff pattern generator supplies a regulated stuff control signal including a non-fixed stuff bit mapping pattern; and,
wherein the mapper controls the mapping of the tributaries in the SPE is response to the non-fixed stuff bit mapping pattern.

15. The system of claim 14 wherein the stuff pattern generator includes:
a modulator having an output to supply a modulated signal;
a stuff generator having inputs to accept rate control information from the filter, the modulated signal, and a stuff opportunity signal, and an output to supply a modulated stuff control signal;
a fixed pattern generator having an input to accept a system clock signal, an output to supply the stuff opportunity signal, and an output to supply a fixed mapping pattern signal; and,
a summing device having an input to accept the modulated stuff control signal, an input to accept the fixed mapping pattern signal, and an output to supply the non-fixed stuff bit mapping pattern.

16. The system of claim 10 wherein the filter is a digital filter; and,
wherein the mapper reduces limit cycle oscillations in the mapping of buffered tributaries into the SPE in response to modulating the rate control information.

17. The system of claim 10 wherein the filter is a type selected from a group consisting of digital filtering and analog filtering.

18. The system of claim 10 wherein the control device produces a signal selected from a group consisting of digital rate control information and analog rate control information.

* * * * *